United States Patent [19]

Kondo et al.

[11] 3,709,334
[45] Jan. 9, 1973

[54] WHEEL BRAKE ASSEMBLY FITTED WITH AUTOMATIC BRAKE CAP ADJUSTING MEANS

[75] Inventors: Toshiyuki Kondo; Asao Kozakai, both of Kariya, Japan

[73] Assignee: Aisin Seiki Kabushiki Kaisha, Kariya, Aichi pref., Japan

[22] Filed: Dec. 23, 1970

[21] Appl. No.: 100,941

[30] Foreign Application Priority Data

Dec. 23, 1969 Japan ............................. 44/104011
Dec. 23, 1969 Japan ............................. 44/104013
Dec. 23, 1969 Japan ............................. 44/104014
Dec. 23, 1969 Japan ............................. 44/104015

[52] U.S. Cl. ...... 188/79.5 P, 188/106 A, 188/196 BA
[51] Int. Cl. ............................................. F16d 51/50
[58] Field of Search ........ 188/79.5 P, 79.5 K, 79.5 B, 188/79.5 GC, 79.5 GT, 106 A, 196 BA

[56] References Cited

UNITED STATES PATENTS 3,338,344  8/1967  Hill ............................. 188/79.5 GC
3,400,787  9/1968  Keller et al. .................. 188/79.5 GT

*Primary Examiner*—Duane A. Reger
*Attorney*—Sughrue, Rothwell, Mion, Zinn & Macpeak

[57] ABSTRACT

This invention relates to an automotive wheel brake assembly fitted with automatic brake gap adjusting means.

The improvement resides in the provision of a three lever—two link type force transmitting linkage mechanism connecting mechanically a parking brake actuator and an automatic brake adjuster per se which is mounted in proximity to a hydraulic brake actuator.

10 Claims, 6 Drawing Figures

INVENTORS
TOSHIYUKI KONDO, ASAO KOZAKAI
BY Sughrue, Rothwell, Mion, Zinn & Macpeak
ATTORNEYS

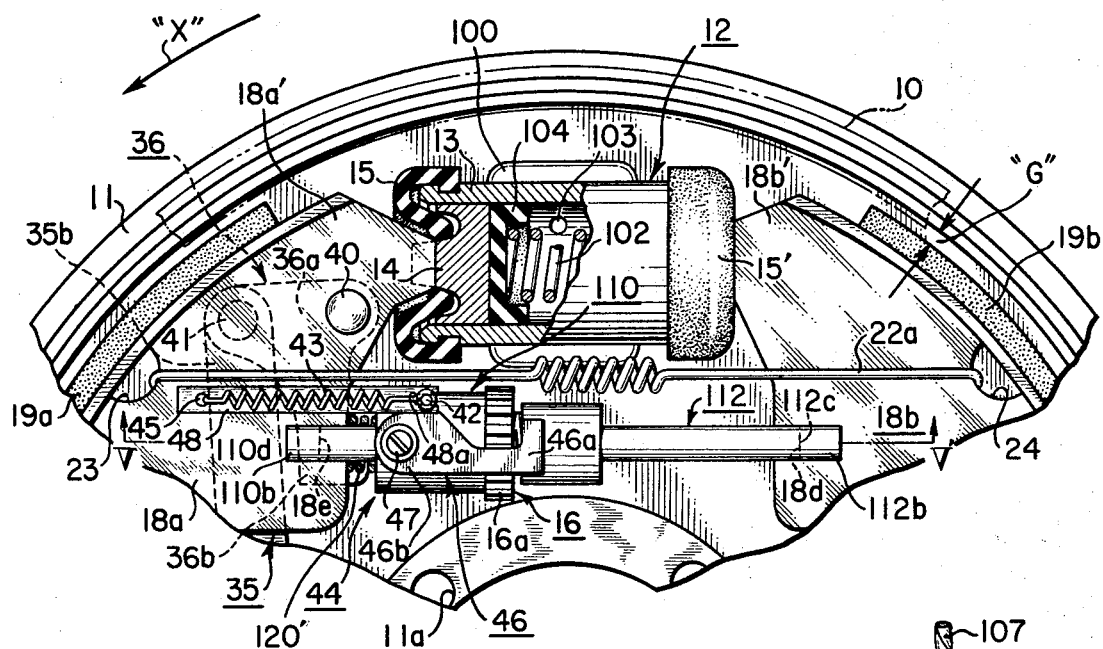

WHEEL BRAKE ASSEMBLY FITTED WITH AUTOMATIC BRAKE CAP ADJUSTING MEANS

This invention relates to improvements in and relating to a wheel brake assembly fitted with automatic brake gap adjusting means.

An operating mode of a representative wheel brake assembly for an automotive vehicle having a service brake and a parking brake fitted thereon is such that when the vehicle operator actuates the parking or emergency brake after application of the service brake and when the service braking effort is larger, a release of the service brake will invite substantially nil effect of the parking brake. Thus, it is a common practice, the parking brake is applied upon release of the service brake application.

Therefore, when the vehicle driver wished to park his vehicle on an inclined traffic surface and practised the aforementioned successive braking procedures, the vehicle could be unintentionally advanced or rearwardly moved by gravity action during the practically non-braking period appearing between the said two braking operations.

As a further example, when the driver operates at first the service brake and then the parking brake, only one of the brakings which is more predominant than the other, as the case may be, will become practically effective. Therefore, the parking brake must be designed so as to have a rather substantial braking effect.

On the other hand, the automatic brake gap adjuster is variously mounted relative to the hydraulic brake actuator. A representative arrangement of the gap adjuster, it is mounted in the actuator. In a further known arrangement, it is mounted in the floating anchor. These arrangement provides disadvantageously the aforementioned conventional drawbacks. In the latter arrangement wherein the gap adjuster is mounted in the floating anchor, the adjuster may be broken when an excessively large force act upon the floating anchor.

The main object of the invention is to provide a hydraulic brake system fitted with the automatic brake gap adjuster void of aforementioned various conventional drawbacks.

Second object of the invention is to provide a hydraulic wheel brake system having the service brake means and the parking brake means, the arrangement being, however, such that the service brake application can be made in the more stabilized leading-trailing mode and the parking brake application is performed in the more effective duo-servo braking mode.

In the first representative hydraulic brake system, the automatic brake gap adjuster is so designed and arranged that the adjuster mounted in the floating anchor is brought into actuation during service brake application.

In the second representative hydraulic brake system, the gap adjuster is mounted in the hydraulic brake actuator. In the former known type, the gap adjusting operation is brought about only by inclusion of brake drum distortion which means naturally a substantial drawback to keep the brake gap rather smaller than the prescribed and desired value. In the latter known arrangement, the hydraulic actuator is slidably mounted on the backing plate, and thus, much is desired relative to the water and dust proofness.

A further object of the invention is to provide an automatic brake gap adjuster void of these conventional drawbacks.

In conventional brake gap adjuster comprising threaded shifter means adapted for correction of the gap by cooperation with a ratchet wheel type gap modifier represents frequently stick of the ratchet rotation by virtue of occasionally applied excessive force, disadvantageous rust formation, partial breakage or the like.

A still further object of the invention is to provide an automatic brake gap adjuster for avoiding such conventional drawback by providing a properly arranged escapement means.

These and further objects, features and advantages of the invention will become more apparent when read the following detailed description of several preferred embodiments of the invention by reference to the accompanying drawings.

In the drawings:

FIG. 2 is an enlarged sectional view taken substantially along a section line II—II' in FIG. 1.

FIG. 3 is a slight enlarged sectional view taken substantially along a section line III—III' in FIG. 1.

FIG. 4 is a part of a front view of a second embodiment of the invention.

Referring now to the accompanying drawings, several preferred embodiments of the invention will be described hereinbelow in detail.

Figure 1:
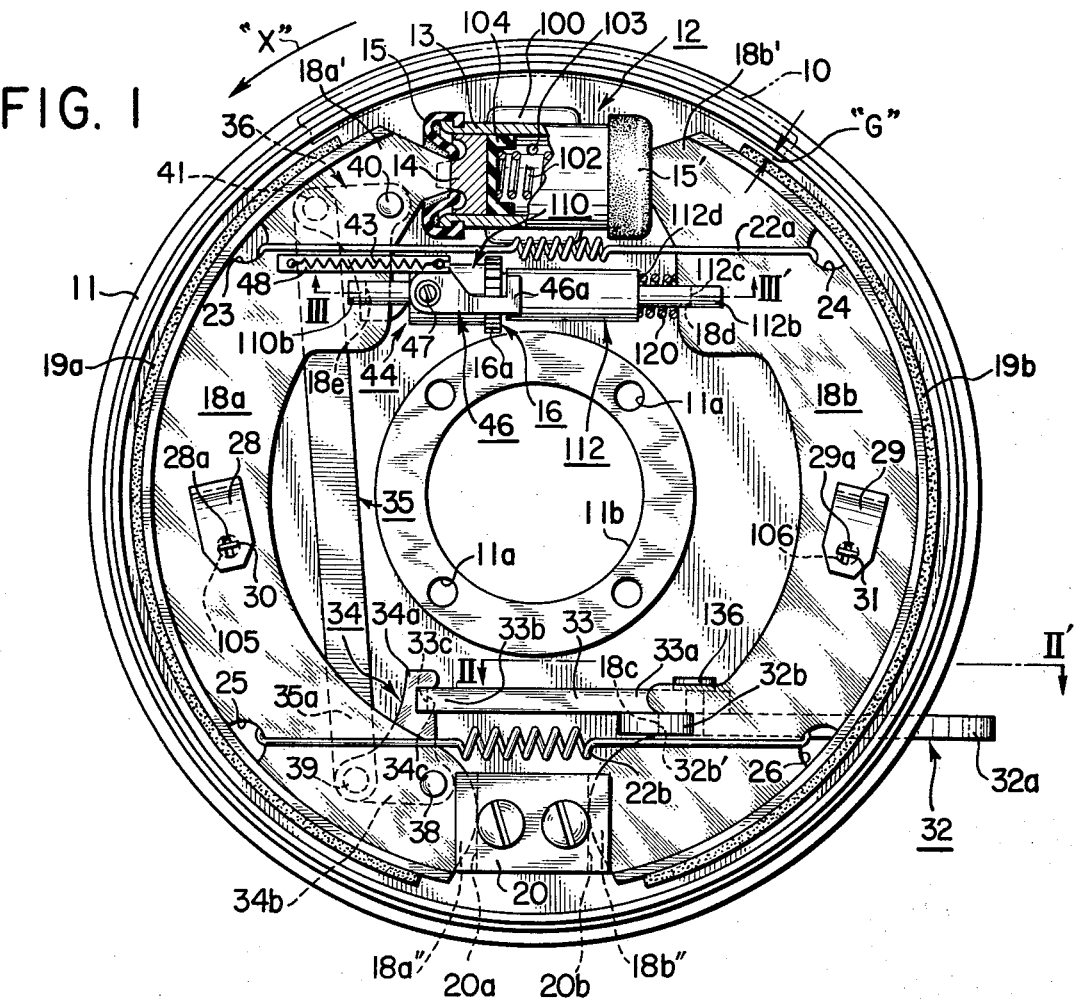
FIG. 1 is a front view of a first embodiment of the invention.
Figure 1A:
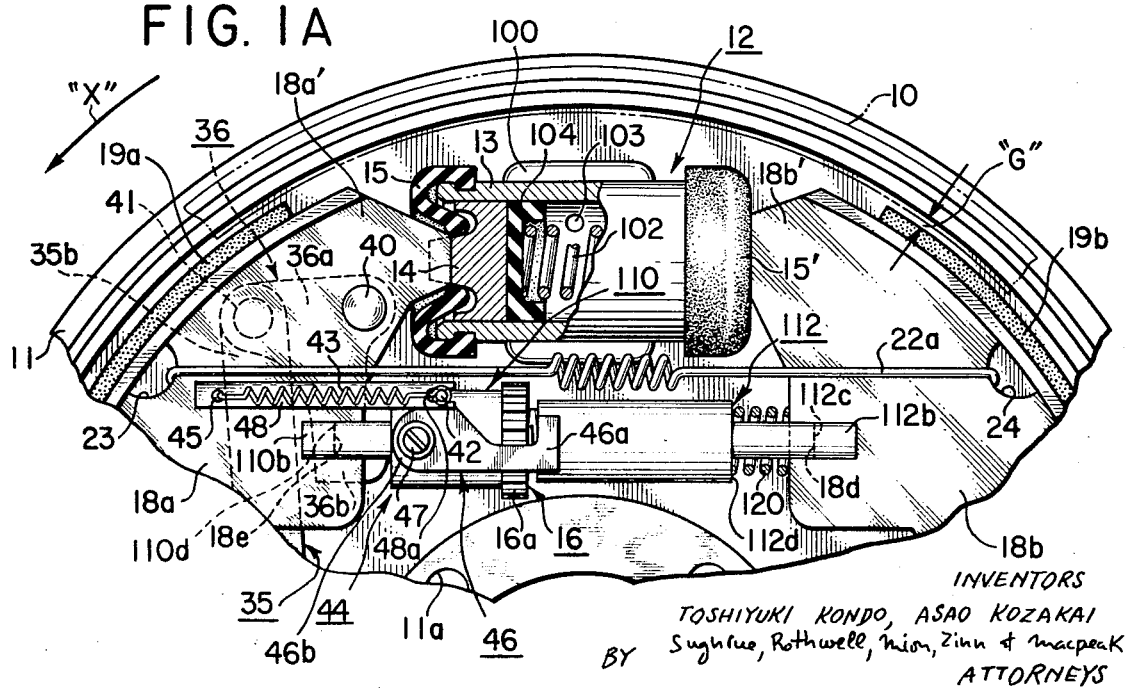
FIG. 1A is a part thereof which has been somewhat enlarged so as to identify certain crowded parts thereof.

At first, referring to FIGS. 1–3, illustrative of a first embodiment of the invention, numeral 10 represents in chain-dotted lines part of a conventional brake drum which is arranged, as commonly known to those skilled in the art, to rotate in unison with a vehicle wheel of a powered and wheeled vehicle, preferably an automotive vehicle.

Numeral 11 represents a conventional backing plate rigid with an axle casing, not shown, for the wheel under consideration and having a plurality of concentrically arranged bolt holes 11a for the fixing purpose by means of bolts or the like conventional fixing means. The backing plate 11 is formed with a central bore 11b for allowing the related wheel axle, not shown, to pass rotatably therethrought.

Numeral 12 represents a hydraulically operated wheel brake-piston cylinder assembly, briefly referred to as "wheel cylinder" by those skilled in the art, is fitted at its bottom with a flat base part 100 only partially appearing in FIG. 1. This flat base 100 is fixingly attached to backing plate 11 by means of bolts or the like fixing means, although not shown only for the sake of simplicity.

Wheel cylinder 12 comprises a hydraulic cylinder body 13 in which a pair of outwardly expandable hydraulic pistons are axially movably mounted. The left-hand piston is shown at 14 together with its cup 104 in their longitudinal and axial section in FIG. 1, while the opposite or right-hand piston is not shown on account of a similar construction thereof. A compression spring 102 is mounted between these two hydraulic pistons. The central cylinder space defined between these pistons and containing the spring 102 is formed with a port 103 which is hydraulically connected as conventionally with a master cylinder, not shown, through a proper piping, again not shown. A pair of ring-shaped dust covers 15 and 15' made of resilient material such as rubber or plastics cover substantially the opposite open ends of cylinder body 13, so as to prevent any invasion of foreign substances such as dust particles into the sliding gap between the cylinder and the expandable pistons. As seen, each of these dust covers is attached fixedly at its outer periphery of the cylinder body 13 and at its inner periphery to the related hydraulic piston.

The outer or actuating ends of these hydraulic pistons are kept in pressure abutment with the respective upper ends 18a' and 18b' of a pair of oppositely arranged expandable brake shoes 18a and 18b, respectively, while the respective lower ends 18a" and 18b" of thereof are kept in pressure contact with the recessed ends 20a and 20b of a stationary anchor 20 fixedly mounted on backing plate 11.

On the outer surfaces of brake shoes 18a and 18b, respective brake lining elements 19a and 19b are fixedly attached by glueing, riveting and/or the like fixing means. Brake shoes 18a and 18b re slidable up-or-down in FIG. 1 with their respective lower ends 18a" and 18b" relative to the anchor 20 and capable of performing pivotal movement about their respective lower contact end points with anchor 20.

Brake shoes 18a and 18b are formed at their intermediate points with respective openings 105 and 106, and pins 30 and 31 extend rotatably from backing plate 11 through said openings, the projecting ends of these pins extend further through recesses 28a and 29a formed through U-shaped springs 28 and 29, respectively, the end extremities of these pins 30 and 31 being formed into stop hooks for the prevention of otherwise possible slip-out of the shoes from contact with the backing plate. Although not shown, the root ends of pins 30 and 31 are pivotably and rotatably mounted in the backing plate so that the shoes 18a and 18b may slide on the respective upper surface of the backing plate to a certain degree. An upper or first tension spring 22a is bridged under tension between anchoring slots or recesses 23 and 24 formed in the respective outer peripheries of the shoes 18a and 18b and near the upper ends thereof when seen in FIG. 1. In the similar way, a lower or second tension spring 22b is bridged under tension between anchoring slots or recesses 25 and 26 formed in the respective outer peripheries of the shoes and near the lower ends thereof when seen again in FIG. 1.

There is provided a parking braking means comprising a L-shaped, first actuating lever 32 having its outer end 32a which is mechanically connected through a connecting wire 107, only partially shown in FIG. 2, to a conventional parking brake lever, not shown, manually operable by the driver of the powered and wheeled vehicle. The first lever 32 is formed with a U-recess 32b' on its opposite end 32b, the latter recess being kept in tongue-and-groove connection with a U-shaped recess 18c formed in the neighborhood of the lower shoe end 18b". The first lever 32 is linked at 136 with one end 33a of first link member 33, while the opposite end 32b of the latter is formed with a U-shaped recess 33c of which is mechanically coupled with U-shaped recess 34c of a second lever 34 which is shaped into substantially into a L-form and pivotably connected at 38 to the lower end 18a" of left-hand shoe 18a. The opposite end of the second L-lever 34 is linked at 39 to the lower end of second link member 35, the latter being linked at its upper end to one end 35b of a third lever 36 at 41. The level 36 is formed again into substantially a L which is pivotably mounted substantially at its middle to the upper end 18a' of the left-hand shoe 18a by means of pivot pin 40, while the opposite end 36b of the third lever 36 is kept at 36c in pressure engagement with a shoulder 110c formed on main body 110 of a floating anchor, generally shown at 112 and fitted with an automatic brake gap adjuster 44, see also FIG. 3. The left-hand reduced part 110b of said main body 110 is formed with a recess 110d which is kept in pressure engagement with a recess 18e formed on the upper end 18a' shoe 18. Floating anchor 112 is formed at its right-hand side with a reduced part 112b having a recess 112c which is kept in pressure engagement with a recess 18d formed on the upper end 18b' of shoe 18b. A spring 120 is wound around the right-hand reduced part 112b, said spring being tensioned between shoulder 112d and shoe 18 and adapted for acting as a kind of gap adjusting actuator, as will be disclosed more specifically hereinafter.

In the left-hand end part of said anchor 112, a threaded blind bore 112a is formed which is kept in meshing with a threaded pin 111 rigid with a gap-adjusting sprocket wheel 16 having teeth 16a on its outer periphery. The oppositely or inwardly directing pin 111 having a non-threaded circular cross-section and made concentrically rigid with the sprocket wheel 16 is rotatably received in a blind hole 110a formed in the main body 110. An adjuster lever 46 is mounted pivotably at 47 on the main body 110, the actuating end 46a of said lever being so positioned to be engageable with the ratchet teeth 16a. The root end 46b of adjuster lever 46 carries slidably a pin 42 which is kept in slidable engagement with an end groove 48a on a L-shaped member 48, as well as a groove 46b formed on the lever 46. A tension spring 43 is bridged under tension between said pin 42 and an anchor hole 45 formed through the outer end of the L-shaped member 48. In this way, the root end portion 46b of lever 46 and the member 48 are kept in resiliently attracting relationship with each other. The outer and lower end of the member 48 is fixedly attached to the shoe 18a, as most clearly seen from FIG. 3.

Motion-receiving end 32a of the first actuating lever 32 is guided in a vertical recess 109a, shown only by a dotted line in FIG. 2, of a stationary guide member 109 rigidly connected with backing plate 11. A return spring 37 is provided as shown in FIG. 1. As seen, one end of this spring 37 is anchored in a reception recess 108 formed on the first lever 32, while the opposite or lower end of the spring is anchored to the guide member 109.

The operation of the first embodiment so far shown and described is an follows:

It is now assumed that the automotive vehicle is travelling forward at a certain speed and the wheel to which the brake drum 10 is attached is rotating in counter clockwise direction when seen in FIG. 1 as hinted by arrow X.

It is further assumed that the vehicle driver depresses a conventional foot-operated brake pedal, not shown, so that the master cylinder, not shown, is actuated and pressure oil is conveyed therefrom through a piping, not shown, to the port 103, thence into the working space of the wheel cylinder 12 defined between the inner ends of the both working pistons thereof, thereby these pistons being hydraulically actuated to expand outwardly against the action of the shoe-attracting springs 22a and 22b. This shoe-expanding action is performed until their brake lining elements 19a and 19b are brought into pressure contact with brake drum 10, so as to perform braking action. During this shoe-expanding operation, the respective lower ends 18a" and 18b" of the shoes will act as respective anchoring ends so that a kind of the leading-trailing braking mode is brought about.

During this service brake application, any brake gap adjusting operation is invited in the automatic gap adjuster, because in this case, L-shaped member 48 is pulled leftwards by the expanding shoe 18a and the thus increasingly accumulated tension in the spring 43 would like to act upon the lever end 46b, so as to rotate the lever 46 in counter clockwise direction in FIG. 1 about its pivot 47. But, in practice, this pivotal movement of the lever 46 can not be effected at this stage, because the tension in spring 120 acts upon the adjuster unit 44 as a whole in such way that it follows after the expanding movement of the shoe 18a.

On the contrary, when the driver pulls the parking brake lever, not shown, for applying the parking brake manually, a pulling force is applied to the wire 107 so as to attract it upwards in FIG. 2. The first lever 32 is pivotingly moved about its pivot pin 136 in counter clockwise direction in FIG. 2 so that the upper end 18b" of shoe 18b is subjected to an outwardly expanding force through the contacting points 32b', 18c. Reaction acting through these contact points and pin 136 upon the first link 33 will cause the latter to move leftwards in FIG. 2, thus the second lever 34 being subjected to an effort for making counter clockwise pivotal movement around its pivot pin 38 and the lower end 18a" being urged to expand outwardly, the lower ends 18a" and 18b" of shoes 18a and 18b are being acted upon in the shoe-expanding directions. At the same time, second link 35 is pulled downwards and third lever 36 is subjected to an effort to rotate in counter clockwise direction about its pivot pin 40, thus the adjuster unit 44 adapted for acting as floating anchor being pushed rightwards in FIG. 1. In this way, all the four ends 18a', 18a", 18b' and 18b" are subjected to expanding effort against the action of shoe-attracting springs 22a and 22b. But, in this preferred embodiment, the spring tension 22b is selected substantially larger than that of spring 22a, the upper shoe ends 18a and 18b' are expanded rather firstly. When the lining elements 19a and 19b have been brought into braking contact with drum, reaction will be transmitted to the brake shoes so as to expand their lower ends 18a" and 18b" outwardly. At this stage, the adjuster unit 44 will act as a kind of floating anchor so that the braking operation is of the duo-servo mode.

It is now assumed that the gap between the brake lining element and the drum has become larger than a predetermined value. Then, it will be seen that during the expanding strokes of the brake shoes 18a and 18b at their upper ends 18a' and 18b', L-shaped member 48 is attracted leftwards in FIG. 1 by the expanding left-hand shoe 18a and the adjusting lever 46 is rotated in counter clockwise direction and the adjuster unit 44 will be shifted rightwards by the third lever rotating counter clockwise and the rightwardly expanding upper end 18b' of right-hand shoe 18. By the pivotal movement of the adjusting lever, the ratchet wheel is partially rotated in such direction as letting the anchoring member 112 to project further and more from the main body 110. Upon establishing brake contact of shoes 18a and 18b with drum 10, a substantial force will act upon the floating anchor through the reaction transmitted from the side of the brake drum, thereby a substantial resistance being imposed on the rotational movement of wheel 16. Therefore, it is highly difficult to rotate the wheel 16 by the adjusting lever 46. If, under these conditions, shoes 18a and 18b should continue to expand, the L-shaped member 48 will slide leftwards against the action of spring 43 by being guided by the pin 42 mounted on the lever 46 and kept in engagement with the mating guide slot. In this way, otherwise possible damage of the adjusting unit will be effectively prevented and the brake gap cannot be influenced adversely by possible mechanical and thermal deformation of the brake drum caused to take place by application of a substantial and prolonged brake application.

Upon release of the parking brake application, return springs 22a and 22b will act upon the adjusting lever 46 to move pivotally in clockwise direction back to its initial position. By repeating the aforementioned operational steps, the excessive gap G will restore the predetermined value.

It will be seen from the foregoing that in the case of the first embodiment so far shown and described, the automatic brake gap adjustment is brought about only during the application of parking brake and without inclusion of correction for occasionally invited drum distorsion, thereby the gap adjustment being made more reliable, accurate and positive. In addition, it will be further seen that with use of the aforementioned adjuster, the gap-correcting operations are limited in its number to a possible minimum so as to provide a substantially increased durability of the gap adjuster.

When need for actuation of the parking brake, the drum temperature is normally substantially lower in its value than the case of application of frequently and substantially applied service brakes, an inclusion of thermal distorsion in the brake drum into the gap adjustment will become less than otherwise. The provision of the gap overdue adjustment prevention means in the above sense will reduce the otherwise larger variation in the brake gap so that the latter can be maintained substantially at a constant value, regardless of the possible drum deformation.

It will be further acknowledged that in the case of application of service brake, a more stabilized leading-trailing mode of brake operation will be established, while in the case of service brake application, a more effective duo-servo braking mode can be established. Therefore, the aforementioned brake arrangement is highly adapted for the braking service on the automotive rear wheels. In addition, the automatic gap adjuster unit per se will act as necessary floating anchor for four shoe ends expansion during the parking brake application.

Upon occasional simultaneous application of service and parking brakes, the braking effect will be performed in the sense of a cumulative manner. In the conventional brake arrangement, release of the service brake from the simultaneous brake application in the above sense, the braking effect could become almost nil under extreme condition or be reduced substantially to about a half of the already attained braking effect.

Referring next to FIG. 4 in combination with FIGS. 2 and 5, the second embodiment of the invention will be described.

Substantial parts of the present embodiment are similar to those in the foregoing first embodiment so that these parts are denoted by same reference numerals as before. In FIG. 4, the mechanism is only partly shown. The remaining portion is same as that shown in FIG. 1.

In the present embodiment, spring 120 inserted in the former embodiment between the floating anchor 112 and the right-hand shoe 18b has been displaced to the position at 120' defined between the main body 110 and the left-hand shoe 18a, as clearly seen from FIG. 4. Therefore, in considering the structure and operation of the present second embodiment, FIG. 3 must be interpreted in the above-mentioned modified sense.

In the present embodiment, the initial tension of spring 43 is so chosen that it will not encounter the rotational resistance of ratchet wheel 16 caused by the shoe-return springs 22a and 22b acting upon the floating anchor 112.

The tension of said spring 43 is also selected that it will encounter the rotational resistance of said ratchet wheel when said return springs 22a and 22b are ineffective in their action upon the floating anchor.

The operation of the second embodiment is as follows:

When the service braking effort is applied, the both brake shoes 18a and 18b will provide a leading-trailing braking effect as before.

Should the brake gap G between drum 10 and shoe 18a or 18b amount to a larger value than a predetermined one, the expansion of left-hand shoe 18a will result in the L-shaped member 48 pulled leftwards in FIG. 4, thus the left-hand end 46b of and justing lever 46 being acted upon by a correspondingly increased tension in the spring 43 and rotated in counter clockwise direction about its pivot 47. The adjuster unit 44 is subjected naturally to a leftward pull which is overcome, however, by the tension in spring 120. In this case, however, the unit 44 is not affected by the combined spring tension at 22a and 22b so that the actuating arm 46a of lever 46 will act upon ratchet teeth 16a on the gap-adjusting wheel 16 so as to rotate the latter in its gap-correcting direction. Therefore, the anchor member 112 is extruded further from the main body 110 by the threaded engagement at 112a. When the service brake is released from its hitherto applied position, the arm 46a of lever 46 is rotated in clockwise direction under the influence of return springs 22a and 22b back to its original position. By repeating these gap-adjusting and return operations, the overdue value of the brake gap will be corrected to the prescribed value.

When the parking brake only is applied, the similar operation is invited as before and the braking effect will be of the duo-servo brake type.

In this case also, as in the case of the service brake application, shoe 18a is moved leftwards and the unit 44 is shifted rightwards, thus the lever 46 being about to rotate the ratchet wheel 16 in its gap-correcting direction. But, in this case, return springs 22a and 22b are acting upon the unit 44 and thus, the spring 43 can not so effective to rotate the wheel 16, resulting only in an elongation of spring 43 and in no gap-correcting effect.

With simultaneous application of the both brakes, the gap correcting motion is invited in substantially same manner as was referred to hereinbefore in the case of service brake application.

It will thus be seen that the overall advantages of the present embodiment over the conventional art are substantially similar as the case of the first embodiment.

In the case of foregoing two embodiments, it will clearly be seen that the force transmission in the case of parking brake application is performed through a specifically designed three lever - two link mechanism which provides considerably less frictional wears on the mutually movable mechanical constituents thereof and a substantially elongated durable life in comparison with other conventional force transmission means.

In the first and second embodiments, and in the case of parking brake application, substantial force will be applied to the floating anchor upon contact of the brake shoes with the brake drum and on account of the reaction transmitted reversely from the side of the drum, thus bringing the rotational resistance subjected to the wheel 16 becoming substantially difficult. Therefore, the actuation of the wheel 16 by the adjusting lever 46 in its gap-adjusting rotational sense will become very difficult. Thus, the automatic gap adjuster is checked from its actuation when the brake reaction exceeds a certain predetermined value which provides a more reliable operational performance and a substantially elongated durable life of the adjuster mechanism over the conventional comparative apparatuses.

Figure 5:
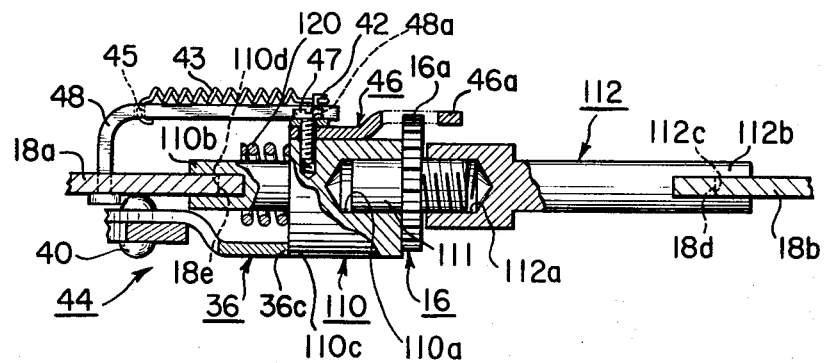
FIG. 5 is a similar view to FIG. 3, the section having been taken along a section line V—V' in FIG. 4, wherein however the member or reduced part 112b being shown in a substantially shortened way on account of simplicity of the drawing.

FIG. 5 represents a modified arrangement from that shown in FIG. 3.

The embodiments of the invention in which an exclusive property or privilege is claimed are defined as follows:

1. An automotive wheel brake system provided with a brake gap adjuster, the latter comprising in combination:

a brake drum rotatable in unison with a wheel, a backing plate fixedly mounted on an axle casing for said wheel, a pair of expandable brake shoes mounted on said backing plate, a hydraulic shoe-actuator expandably mounted on said backing plate and operatively connected to one end of each of said shoes, a stationary anchor mounted on said backing plate, the other end of each of said shoes being normally kept in pressure contact with said stationary anchor, a pair of shoe-return springs tensioned between said shoes for exerting return movement effort thereon, linkage means containing at least a toggle means and adapted for expanding all the ends of the shoes upon parking brake application, a floating anchor mounted between said shoes and in proximity to said hydraulic actuator, a first spring means mounted between said floating anchor and either of said shoes, automatic brake gap adjuster means mounted on said floating anchor and comprising a screwed shifting means and a ratchet mechanism operatively connected therewith, and a second spring means, one end thereof being anchored on one of said shoes and the other end of said spring means being arranged to actuate said ratchet mechanism.

2. Brake gap adjuster as claimed in claim 1, wherein said second spring is larger in its spring force than the rotational resistance appearing at the screwed shifting means provided by said return springs.

3. Brake gap adjuster as claimed in claim 1, wherein said hydraulic actuator comprises a wheel cylinder body fixedly mounted on said backing plate, a pair of hydraulically expandable pistons mounted in said cylinder body, and a spring mounted between said pistons.

4. Brake gap adjuster as claimed in claim 1, wherein said floating anchor is kept in pressure engagement with each of the both brake shoes through a kind of releasable fork joint.

5. Brake gap adjuster as claimed in claim 1, wherein said linkage means comprising a first lever mechanically connected with parking brake means and adapted for engaging with one of said shoes, a second lever pivotably connected with the other of said shoes, a third lever pivotably connected with said other of said shoes and adapted for engaging with the floating anchor, thereby expanding all the ends of the shoes upon applying the parking brake.

6. Brake gap adjuster as claimed in claim 1, wherein said ratchet mechanism comprises an adjusting lever actuated upon by said second spring means, and a ratchet wheel adapted for being actuated upon by said adjusting lever, and said screwed shifting means comprising male threads formed in said ratchet wheel and mating female threads formed on said floating anchor.

7. Brake gap adjuster as claimed in claim 6, wherein said second spring means is tensioned by anchoring its one end on one end of a L-shaped member and its other end on said adjusting lever, thereby said member and said lever being pulled resiliently towards each other.

8. Brake gap adjuster as claimed in claim 1, wherein said first spring means is tensioned between said floating anchor and one of said shoes and the tension of said second spring means is so selected that it has less effect upon the screwed shifting means when the latter is actuated upon by said shoe-returning springs.

9. Brake gap adjuster as claimed in claim 2, wherein the tension of said second spring is so selected that it overcomes the rotational resistance of said screwed shifting means when the latter is actuated upon by said first spring means.

10. Brake gap adjuster as claimed in claim 8, wherein the tension of said second spring is so selected that it overcomes the rotational resistance of said screwed shifting means when the latter is actuated upon by said first spring means.

* * * * *